June 3, 1958 — R. T. SCHULTZ — 2,837,651

POWER OSCILLATORS

Filed Nov. 14, 1955 — 3 Sheets-Sheet 1

ROBERT T. SCHULTZ,
INVENTOR

BY William R. Spensley

ATTORNEY

June 3, 1958 R. T. SCHULTZ 2,837,651

POWER OSCILLATORS

Filed Nov. 14, 1955 3 Sheets-Sheet 2

ROBERT T. SCHULTZ,
INVENTOR

BY William R. Sperry

ATTORNEY

ROBERT T. SCHULTZ,
INVENTOR

BY William R. Spensley

ATTORNEY

United States Patent Office 2,837,651

Patented June 3, 1958

2,837,651

POWER OSCILLATORS

Robert T. Schultz, Duarte, Calif., assignor to Motordyne Inc., Monrovia, Calif., a corporation of California Application November 14, 1955, Serial No. 546,666

16 Claims. (Cl. 250—36)

This invention relates generally to oscillators and more particularly to a rectangular wave power oscillator which utilizes transistors as active circuit elements.

The uses for a rectangular wave power oscillator are many and varied throughout the electronic field. For example, such a circuit may be employed to convert low direct-current voltage to relatively high direct-current voltage, or to convert direct-current voltage to alternating-current voltage. There are presently many circuits for producing such wave forms including some circuits employing transistors as active circuit elements.

One square wave oscillator that has been developed which uses transistors as active circuit elements is described in an article in the June 1955 issue of Proceedings of the IRE, page 99, entitled "A new self-excited square wave oscillator," by George C. Uchrine and Wilfred O. Taylor. This article discloses two transistors operating push-pull employing a common base connection.

Another such circuit is disclosed in the December 1954 issue of Electrical Manufacturing in an article entitled "Transistors as on-off switches in saturable core circuits," by R. Louis Bright, G. Frank Pittman, Jr., and George H. Royer, with particular reference to page 81, Figure 3, which shows two transistors connected in a common emitter configuration.

In order to obtain proper operation utilizing either of the above mentioned circuits, a transformer having a core of magnetic material having a substantially rectangular hysteresis loop must be utilized. Transformer cores of this type of material are extremely difficult to manufacture and are, thus, prohibitively expensive for use in production items.

A further limitation of the circuits as disclosed above is that the transistors employed therein must be electrically insulated from the chassis upon which they are mounted. This limits the amount of heat which may be conducted away from the transistor mounting which in turn limits the power that may be supplied by the transistors.

Accordingly, an object of the present invention is to provide an oscillator for producing substantially rectangular wave forms of voltage which employs a relatively small amount of magnetic material having a substantially rectangular hysteresis loop.

Another object of the present invention is to provide a transistor power oscillator which will supply relatively large amounts of power and which will not tend to exceed the rated dissipation of the transistors employed therein.

A power oscillator in accordance with the present invention comprises first and second signal translating devices, each having output, common and control electrodes, the common electrodes being interconnected and returned to a point of fixed potential. Individual feedback means is connected between each output and control electrode. Means for producing an output signal is connected between the output electrodes while means for controlling the frequency of oscillations is effectively connected across the feedback and output producing means.

The novel features of the present invention are set forth in particularity in the appended claims. Other and more specific objects of the invention will become apparent from consideration of the following description taken in conjunction with the accompanying drawings wherein like components are designated by the same reference characters in which:

Figure 1:
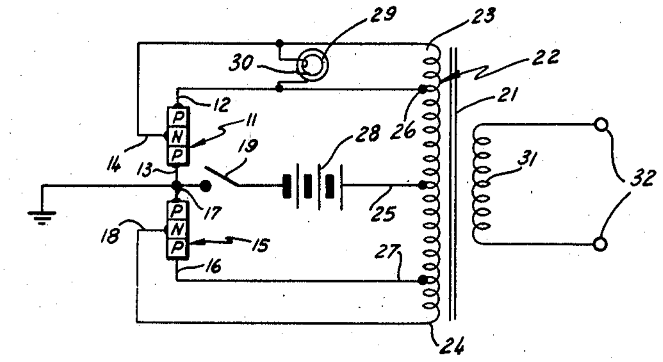
Fig. 1 is a schematic diagram of one embodiment of the oscillator of the present invention.

Referring now to the drawings and more particularly to Fig. 1, there is shown a transistor represented by a rectangle 11 divided into three equal divisions. Each division has the letter P or N therein which indicates a particularly type transistor, and in the presently preferred embodiment is a P–N–P type junction transistor. It is to be understood that even though P–N–P transistors are utilized, N–P–N transistors may be used by reversing the polarities of all voltages and currents applied thereto as hereinafter discussed. Transistor 11 has an emitter 12, a collector 13, and a base 14.

Also shown is a transistor 15 represented by the same symbol as discussed in the above paragraph. Transistor 15 has an emitter 16, a collector 17, and a base 18. Collectors 13 and 17 are connected together and returned to a point of fixed potential such as ground. There is shown a transformer 21 having a primary winding 22 and secondary winding 31. Secondary winding 31 includes output terminals 32. The primary winding has two terminals 23 and 24, a center tap 25, and two intermediate taps 26 and 27. A source of operating potential such as battery 28 has its positive terminal connected to center tap 25 and its negative terminal connected to one side of switch 19, the other side of switch 19 being connected to ground. Bases 14 and 18 are connected to terminals 23 and 24 respectively, while emitter 12 is connected to intermediate tap 26 and emitter 16 is connected to intermediate tap 27. In the presently preferred embodiment means for controlling the frequency of the power oscillator as represented in Fig. 1 includes, for example, a toroidal core 29 of magnetic material having a substantially rectangular hysteresis loop. Core 29 includes a winding 30 which is connected between emitter 12 and terminal 23.

Referring now to the operation of the circuit of Fig. 1, during quiescent condition, when switch 19 is open, both transistors 11 and 15 are non-conducting since no operating potential is applied to the transistors. If the circuit is now placed into operation by closing switch 19 current begins to flow through primary winding 22 of transformer 23 upon the occurrence of any unbalance within the circuit components of the oscillator of Fig. 1.

Assume that the unbalance occurs such as to cause transistor 11 to become conducting and transistor 15 to remain non-conducting. The polarity of the voltage drops across the feedback winding utilized by transistor 11, that is that portion of primary winding 22 between terminal 23 and intermediate tap 26, is positive at tap 26 and negative at terminal 23 thus applying positive feedback to transistor 11 causing it to conduct more heavily. Transistor 15 is maintained non-conducting by the polarity of the voltage drop between terminal 24 and intermediate tap 27 since base 18 is maintained slightly positive with respect to emitter 16. Therefore, the impedance represented by transistor 11 becomes almost zero while transistor 15 presents substantially an open circuit, being the back biased impedance of the emitter-base section. Current then flows through primary winding 22 between center tap 25 and terminal 23, building up a magnetic flux in primary winding 22. This causes essentially the entire voltage of battery 28 to be dropped between center tap 25 and terminal 23.

Since the voltage appearing across toroid 29 and its associated winding 30 is constant the current through winding 30 and the flux within toroid 29 will increase linearly with time until toroid 29 saturates. This will become more readily apparent by reference to Fig. 6 wherein the abscissa represents ampere-turns and the ordinate flux. Assuming the flux within toroid 29 is at point A, upon application of the voltage to winding 30 current begins to flow through it. As the current increases in value the flux within toroid 29 also increases moving toward point B. Upon reaching point B the flux immediately jumps to point C, and continues to rise to point D where toroid 29 is fully saturated. Upon saturation of toroid 29 the voltage impressed across winding 30 falls to zero. When this occurs toroid 29 and winding 30 appear essentially as a short circuit to the feedback winding across which it is connected. This short is in turn reflected across the entire primary winding 22 causing the magnetic field which is built up around primary winding 22 to begin to collapse. The collapsing magnetic field induces voltages in the feedback windings of opposite polarities to those above discussed causing transistor 11 to become non-conducting and transistor 15 to become conducting.

The reversal in conduction of the transistors causes the current flowing through the primary winding to reverse direction and flow from center tap 25 to terminal 24 building up a magnetic field in the opposite direction. The reversal of the polarity of voltage applied to transistor 11 through the feedback winding also reverses the polarity of the potential applied across winding 30 on toroid 29. This causes current to flow therethrough in the opposite direction which causes the flux within toroid 29 to move from point D through C, E and to F. Upon reaching point F the flux immediately jumps to point G and continues to move to point H. At this point toroid 29 is saturated in the opposite direction and the voltage impressed upon winding 30 once more falls to zero with the same result as hereinbefore described. This causes transistors 11 and 15 to once more reverse their state of operation, transistor 11 becoming conducting and transistor 15 becoming non-conducting.

The frequency at which the cycle of events above described occurs is dependent upon the characteristics of the hysteresis loop of toroid 29 and the number of turns in winding 30 taken together. Once a particular toroid is chosen the frequency of operation may be changed by merely increasing or decreasing the number of turns in winding 30 assuming the number of turns in the feedback winding remains fixed.

Figure 6:
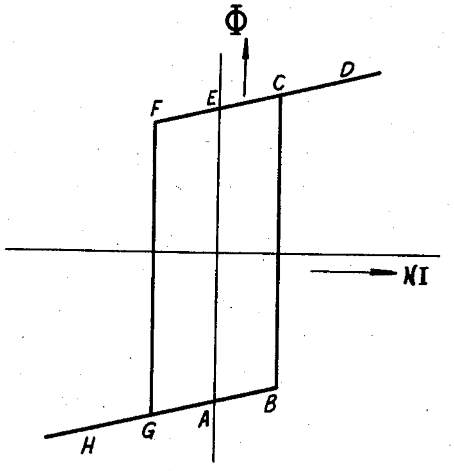
Fig. 6 is a graph illustrating a substantially rectangular hysteresis loop for magnetic material.

If toroid 29 or its equivalent were not used, the core of transformer 21 would have to be constructed of substantially the same type of material as that used in toroid 29 in order to obtain the hysteresis loop shown in Fig. 6 to produce the results as described in the foregoing description of operation.

It is, therefore, seen that transistors 11 and 15, becoming first conducting and then non-conducting operate essentially as a pair of switches placed across transformer 21 and battery 28 causing current to flow first one direction and then the other through primary 22 of transformer 21, the reversal of direction taking place almost instantaneously. Current flowing in opposite directions through primary winding 22 and the consequent build up of magnetic fields in opposite directions induces a signal in secondary winding 31 through normal transformer action. This signal is substantially a square wave and can be utilized by connecting a desirable load across terminals 32 of secondary winding 31.

Figure 3:
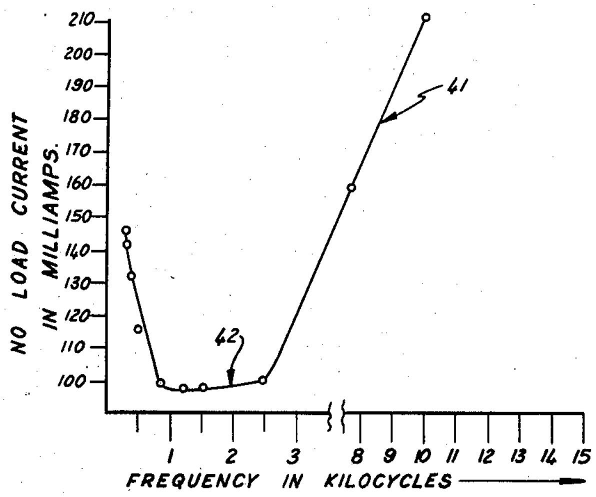
Fig. 3 is a graph illustrating the no-load current drawn by the circuit of Fig. 2.

The circuit as shown in Fig. 1 operates between the limits of approximately zero to 15 kilocycles per second. However, by reference to Fig. 3, wherein the abscissa represents frequency in kilocycles per seconds and the ordinate no load current in milliamperes, it is seen that an optimum range of operation with respect to frequency is reached between one and three kilocycles per second as represented by the flat portion 42 of curve 41. This optimum range is such as to obtain the most desired results for practically all applications.

Figure 4:
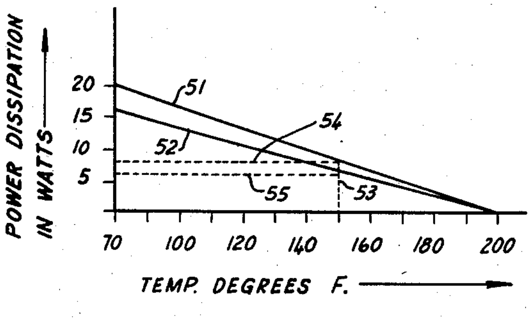
Fig. 4 is a graph illustrating power dissipation for different circuit connections.

By reference to Fig. 4, wherein the abscissa represents temperature in degrees Fahrenheit and the ordinate power dissipation in watts, it is seen that a higher power dissipation than that presently realized in the art may be obtained through the use of the transistor connections as shown in Fig. 1. Curve 52 represents the power dissipation of a circuit which utilizes common base or common emitter connections wherein a mica washer must be used to insulate the housing of the transistor from the chassis upon which it is mounted. In the circuit as shown in Fig. 1 no such insulation is necessary since in the conventional transistor housing the collectors are connected to the housing and, as shown, the collectors in the circuit of Fig. 1 are connected to ground. Therefore, transistors 11 and 15 operate upon dissipation curve 51 as shown in Fig. 4. If an operating temperature of approximately 150° F. is chosen, it is seen by extending dashed line 53 upwards therefrom and drawing parallel dashed lines 54 and 55 horizontally toward the ordinate that approximately two more watts may be dissipated by using the connection shown in Fig. 1. It is, therefore, seen that more power may be realized from given transistors through the connections as shown in Fig. 1.

Although the circuit as shown in Fig. 1 operates well in most applications it has one disadvantage. If the load which would be connected to terminals 32 of secondary winding 31 were largely capacitive in nature some difficulty in initiating oscillations may occur.

Figure 2:
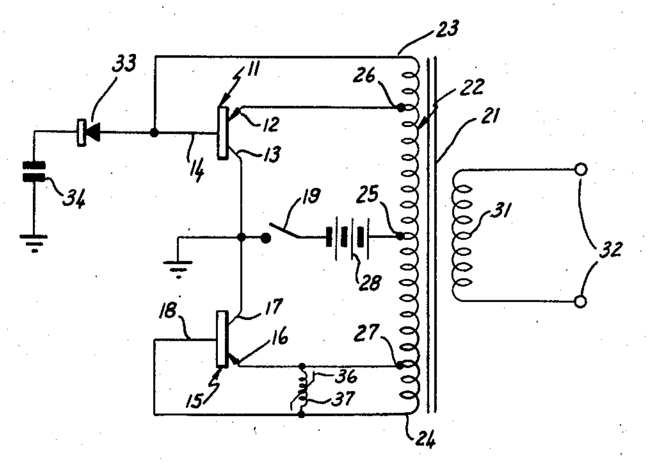
Fig. 2 is a schematic diagram of an alternative embodiment of the power oscillator of the present invention.

Reference is now made to Fig. 2 wherein transistors 11 and 15 are represented by their conventional schematic symbol. The frequency control means is shown to include a core of magnetic material 36 having a substantially rectangular hysteresis loop as shown by the schematic symbol used therefor and which includes a winding 37 connected between emitter 16 and base 18. This indicates that the frequency control means may be connected between the emitter and base of either of the two transistors. A diode 33 and a capacitor 34 are connected in series between base 14 and ground. The remainder of the circuit of Fig. 2 is identical to that as shown in Fig. 1, as indicated by using the same reference characters.

The operation of the circuit as shown in Fig. 2 is essentially the same as that described for the circuit of Fig. 1 with the following exception. Upon initiation of the circuit of Fig. 2, a positive potential is applied to the anode of diode 33 causing it to become conducting. This applies the potential of battery 28 across capacitor 34. This causes essentially zero voltage to be applied to transistor 11. At the same instant essentially the full value of the potential of battery 28 is applied to transistor 15. Therefore transistor 15 will become conducting and transistor 11 will remain non-conducting. In this manner a positive initiation of oscillation is assured irrespective of load conditions since an unbalance in circuit components is not relied upon to determine which transistor will first become conducting. As this occurs capacitor 34 will charge toward the potential level of battery 28. As the transistors reverse their state of operation due to the action of core 36, that is, transistor 15 becomes non-conducting and transistor 11 conducting, diode 33 will become non-conducting since the potential applied thereto is now reversed. This prohibits the charge which was acquired by capacitor 34 from affecting the proper operation of transistor 11 or from leaking off since the only discharge path is through the back biased impedance of diode 33 which will be essentially an open circuit.

It has been determined from experimentation that by use of the diode and capacitor as shown in the circuit of Fig. 2, oscillations may be initiated with no difficulty even though the oscillator is connected to a load as large as 10 microfarads.

It is to be understood that the values for the components shown may vary according to any particular design consideration. The following values are given by way of example only for the circuit as shown in Fig. 2, which will oscillate at a frequency of approximately 1000 cycles per second.

Transistors 11 and 15—Minneapolis-Honeywell P–N–P junction transistors type 2N57
Toroid 29—Arnold Engineering Mo Permalloy Type 5340 core
Winding 30—25 turns
Transformer 21:
  Core—Westinghouse Hypersil type M–15
  Primary winding 23—120 turns each side of center tap
  Feedback windings—18 turns each
Battery 28—25 volts
Capacitor 34—3 microfarads
Diode 33—General Electric Co. type 1N92

If the power oscillator of the present invention is to be utilized to convert a low direct-current voltage to a higher direct-current voltage, the starting circuit utilized in the power oscillator as shown in Fig. 2 can be eliminated by proper choice of circuit components in the filter network of the load. This will be better understood by referring now more particularly to Fig. 5 where there is shown a power oscillator in accordance with the present invention which is identical to the circuit of Fig. 2 as indicated by use of the same reference characters, except that diode 33 and capacitor 34 are deleted.

There is shown a bridge rectifier including rectifiers 61 and 62 having their cathodes connected together at point T and rectifiers 63 and 64 having their anodes connected together at point U. The anode of rectifier 61 is connected to the cathode of rectifier 63 at point R while the anode of rectifier 62 is connected to the cathode of rectifier 64 at point S. The rectifier is across output terminals 32 of secondary winding 31. A Pi network filter including shunt capacitors 65 and 66 and series inductance 67 is connected across points T and U of the bridge rectifier.

The oscillator operates in the manner hereinabove described producing output rectangular waves. The bridge rectifier operates in the conventional manner; rectifiers 61 and 64 being conducting when the oscillator output signal is positive at point R and negative at point S, and rectifiers 62 and 63 being conducting when the polarities at points R and S are reversed thus producing full wave rectification. The filter operates in the conventional manner producing a direct-current output signal at terminals 68.

Figure 5:
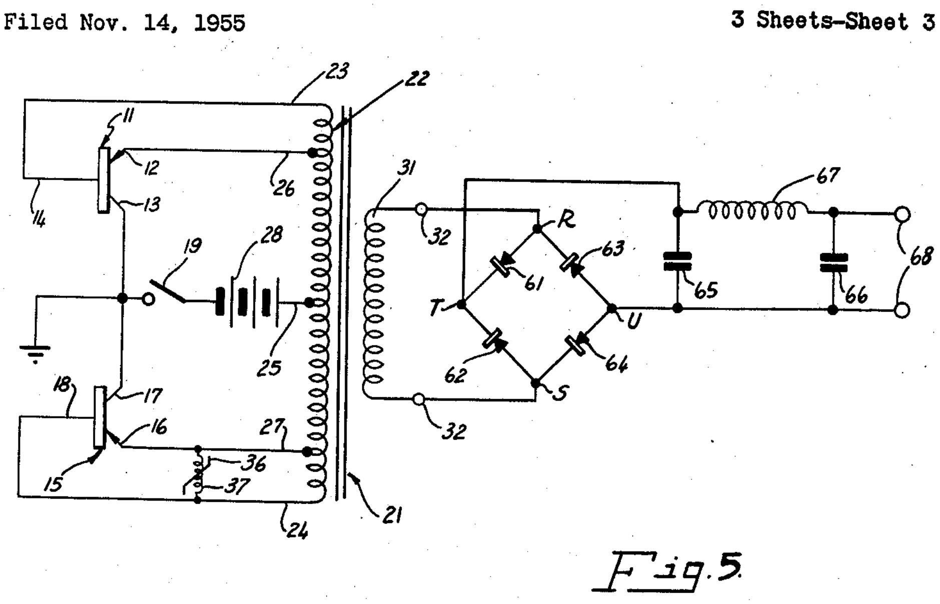
Fig. 5 is a schematic diagram of still another alternative embodiment of the power oscillator of the present invention.

To facilitate initiation of oscillations of the circuit of Fig. 5 inductor 67 and capacitor 66 should be chosen to be approximately resonant to the frequency of oscillation of the oscillator. This would present a low impedance load to the oscillator since the resonant circuit would appear to an alternating current signal as a very low impedance shunting any impedance in the load connected to terminals 68. Therefore, the oscillator of Fig. 5 would initiate oscillations under any load condition.

While a common collector connection is shown for the circuits of Fig. 1, Fig. 2 and Fig. 5, a common base or common emitter connection may be used if the additional power realizable from the common collector connection is not desirable. If either of these connections is employed, the frequency control means should be connected between a center tap of the feedback winding and ground.

There have been thus disclosed several embodiments of a power transistor oscillator which produce rectangular waves and which employ a minimum amount of magnetic material having a substantially rectangular hysteresis loop and which will operate supplying a substantially larger amount of power than heretofore realized from such a circuit.

What is claimed is:

1. A power oscillator comprising: a first signal translating device having a first common electrode, a first output electrode, and a first control electrode; a second signal translating device having a second common electrode, a second output electrode, and a second control electrode, said common electrodes being interconnected and returned to a point of fixed potential; first feedback means connected between said first output and control electrodes; second feedback means connected between said second output and control electrodes; means for developing an output signal connected between said first and second output electrodes; frequency control means including a core of magnetic material having a substantially rectangular hysteresis loop effectively connected in parallel with said first feedback means, said second feedback means and said output signal developing means; and a source of operating potential connected between said output signal developing means and said point of fixed potential.

2. A power oscillator comprising: a first signal translating device having a first common electrode, a first output electrode, and a first control electrode; a second signal translating device having a second common electrode, a second output electrode, and a second control electrode, said common electrodes being interconnected and returned to a point of fixed potential; a transformer including a secondary winding and a primary winding, said primary winding including a center tap, first and second intermediate taps and first and second terminals, said first and second output electrodes being connected to said first and second intermediate taps respectively, said first and second control electrodes being connected to said first and second terminals respectively; frequency control means including a core of magnetic material having a substantially rectangular hysteresis loop effectively connected between said first and second terminals; and a source of operating potential connected between said center tap and said point of fixed potential.

3. A transistor power oscillator comprising: a first transistor having a first collector, a first emitter, and a first base; a second transistor having a second collector, second emitter and a second base; said collectors being interconnected and returned to a point of fixed potential; a transformer including a secondary winding and a primary winding, said primary winding including a center tap, first and second intermediate taps, and first and second terminals; said first and second emitters being connected to said first and second intermediate taps respectively, said first and second bases being connected to said first and second terminals respectively; frequency control means including a core of magnetic material having a substantially rectangular hysteresis loop effectively connected between said first and second terminals; and a source of operating potential connected between said center tap and said point of fixed potential.

4. A transistor power oscillator comprising: a first transistor having a first collector, a first emitter, and a first base; a second transistor having a second collector, second emitter and a second base; said collectors being interconnected and returned to a point of fixed potential;

a transformer including a secondary winding and a primary winding, said primary winding including a center tap, first and second intermediate taps, and first and second terminals; said first and second emitters being connected to said first and second intermediate taps respectively, said first and second bases being connected to said first and second terminals respectively; frequency control means including a core of magnetic material having a substantially rectangular hysteresis loop connected between said first base and said first emitter; and a source of operating potential connected between said center tap and said point of fixed potential.

5. The transistor power oscillator as defined in claim 4 wherein said first and second transistors are P–N–P junction transistors and said source of potential includes a positive and negative terminal, said negative terminal being connected to said point of fixed potential and said positive terminal being connected to said center tap.

6. The transistor power oscillator as defined in claim 4 wherein said frequency control means includes windings upon said core of magnetic material said windings being connected between said first base and said emitter.

7. A power oscillator comprising: first and second transistors each including an emitter, a collector, and a base, said collectors being interconnected and returned to a point of fixed potential; separate feedback means connected individually between each emitter and its associated base; output signal producing means connected between said emitters including means for initiating oscillations of said oscillator; and frequency control means including a core of magnetic material having a substantially rectangular hysteresis loop effectively connected across said output signal producing means.

8. The power oscillator as defined in claim 7 wherein said initiating means includes an inductive impedance element and a capacitive impedance element connected in series and adapted to be resonant at substantially the frequency of oscillations of said oscillator.

9. The power oscillator as defined in claim 7 wherein said initiating means includes a resistive impedance element and a unidirectional current flow device connected in series between said output signal producing means and said point of fixed potential.

10. A power oscillator comprising: a first junction transistor having a first emitter, a first collector, and a first base; a second junction transistor having a second emitter, a second collector, and a second base, said first and second collectors being interconnected and returned to a point of fixed potential; a transformer including a primary winding and a secondary winding, said primary winding including a center tap and first and second terminals, said first and second bases being connected to said first and second terminals respectively, said first and second emitters being connected intermediate said first terminal and said center tap and said second terminal and said center tap respectively; a core of magnetic material having a substantially rectangular hysteresis loop including windings thereon, said windings being connected between said first terminal and said first emitter; a source of operating potential connected between said center tap and said point of fixed potential; and rectifying means connected across said secondary winding including an inductor and a capacitor connected in series and selected to be series resonant at substantially the frequency of oscillations of said oscillator for initiating oscillations of said oscillator irrespective of load conditions.

11. A transistor power oscillator comprising: a first transistor having a first collector, a first emitter, and a first base; a second transistor having a second collector, second emitter and a second base; said collectors being interconnected and returned to a point of fixed potential; a transformer including a secondary winding and a primary winding, said primary winding having a center tap, first and second intermediate taps, and first and second terminals, said first and second emitters being connected to said first and second intermediate taps respectively, said first and second bases being connected to said first and second terminals respectively; means for initiating oscillations of said oscillator connected between said first terminal and said point of fixed potential; a core magnetic material having a substantially rectangular hysteresis loop including windings thereon, said windings being connected between said first base and said first emitter; and a source of operating potential connected between said center tap and said point of fixed potential.

12. A transistor power oscillator comprising: a first transistor having a first collector, a first emitter, and a first base; a second transistor having a second collector, second emitter and a second base; said collectors being interconnected and returned to a point of fixed potential; a transformer including a secondary winding and a primary winding, said primary winding having a center tap, first and second intermediate taps, and first and second terminals, said first and second emitters being connected to said first and second intermediate taps respectively, said first and second bases being connected to said first and second terminals respectively; rectifying means and charge storage means connected in series between said second terminal and said point of fixed potential for initiating oscillations of said oscillator; a core of magnetic material having a substantially rectangular hysteresis loop including windings thereon, said windings being connected between said first collector and said first base; and a source of operating potential connected between said center tap and said point of fixed potential.

13. The transistor power oscillator as defined in claim 12 wherein said rectifying means is a semiconductor diode and said charge storage means is a capacitor.

14. A transistor power oscillator comprising: a first transistor having a first collector, a first emitter, and a first base; a second transistor having a second collector, second emitter and a second base; said emitters being interconnected and returned to a point of fixed potential; a transformer including a secondary winding and a primary winding, said primary winding including a center tap, first and second intermediate taps, and first and second terminals; said first and second collectors being connected to said first and second intermediate taps respectively, said first and second bases being connected to said first and second terminals respectively; a core of magnetic material having a substantially rectangular hysteresis loop including windings thereon, said windings being connected between said first collector and said first base; and a source of operating potential connected between said center tap and said point of fixed potential.

15. A transistor power oscillator comprising: a first transistor having a first collector, a first emitter, and a first base; a second transistor having a second collector, second emitter and a second base; said emitters being interconnected and returned to a point of fixed potential; a transformer including a secondary winding and a primary winding, said primary winding including a center tap, first and second intermediate taps, and first and second terminals; said first and second collectors being connected to said first and second intermediate taps respectively, said first and second bases being connected to said first and second terminals respectively; a core of magnetic material having a substantially rectangular hysteresis loop including windings thereon, said windings being connected between said first emitter and said first collector; and a source of operating potential connected between said center tap and said point of fixed potential.

16. A transistor power oscillator comprising: a first transistor having a first emitter, a first collector and a first base; a second transistor having a second emitter, a second collector and a second base, said collectors being interconnected and returned to a point of fixed potential; a transformer including a secondary winding and a primary winding, said primary winding having a center tap, first and second intermediate taps, and first and second terminals; said first emitter being connected to said first intermediate tap, said second emitter being connected to said second intermediate tap, said first base being connected to said first terminal, said second base being connected to said second terminal; a semi-conductor diode connected to said first terminal; a capacitor connected between said semi-conductor diode and said point of fixed potential; a source of operating potential connected between said center tap and said point of fixed potential; a toroidal core of magnetic material having a substantially rectangular hysteresis loop and including a winding, said winding being connected between said second base and said second emitter to control the frequency of said oscillator.

References Cited in the file of this patent

UNITED STATES PATENTS

| | | |
|---|---|---|
| 2,698,386 | Eberhard et al. | Dec. 28, 1954 |
| 2,748,274 | Pearlman | May 29, 1956 |